United States Patent
Li et al.

(10) Patent No.: US 6,719,109 B1
(45) Date of Patent: Apr. 13, 2004

(54) METHOD FOR CONTROLLING A BI-DIRECTIONAL CLUTCH

(75) Inventors: Jin Li, Rochester Hills, MI (US); Mark Buchanan, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 18 days.

(21) Appl. No.: 10/260,998

(22) Filed: Sep. 30, 2002

(51) Int. Cl.[7] .............................................. B60K 41/22
(52) U.S. Cl. ................... 192/3.52; 192/3.61; 192/3.63; 475/286; 475/292; 475/318
(58) Field of Search ................. 192/43.1, 3.61, 192/3.52, 3.63; 475/276, 292, 318, 286

(56) References Cited

U.S. PATENT DOCUMENTS

| | | |
|---|---|---|
| 1,831,955 A | 11/1931 | Harney |
| 2,173,044 A | 9/1939 | Ruggles et al. ............... 180/44 |
| 2,290,089 A | 7/1942 | Bock ........................... 180/49 |
| 2,551,939 A | 5/1951 | Gerst .......................... 192/48 |
| 2,887,201 A | 5/1959 | Willis .......................... 192/67 |
| 2,906,383 A | 9/1959 | Gabriel ........................ 192/85 |
| 2,969,134 A | 1/1961 | Wiedmann et al. ........... 192/84 |
| 3,481,436 A | 12/1969 | Wilkowski ................... 192/35 |
| 3,517,573 A | 6/1970 | Roper .......................... 74/711 |
| 3,631,741 A | 1/1972 | Kelbel ......................... 74/781 |
| 4,114,478 A | 9/1978 | Clauss ......................... 74/781 |
| 4,407,387 A | 10/1983 | Lindbert ..................... 180/247 |
| 4,537,092 A * | 8/1985 | Morisawa .................... 475/66 |
| 4,667,540 A * | 5/1987 | Yagi ............................ 701/60 |
| 5,152,726 A | 10/1992 | Lederman ................... 475/324 |
| 5,355,981 A | 10/1994 | Itoh et al. ..................... 192/35 |
| 5,466,195 A | 11/1995 | Nogle et al. .................. 475/55 |
| 5,584,776 A | 12/1996 | Weilant et al. .............. 475/213 |
| 5,641,043 A * | 6/1997 | Niiyama ..................... 192/3.63 |
| 5,653,322 A | 8/1997 | Vasa et al. .................... 192/85 |
| 5,704,867 A | 1/1998 | Bowen ........................ 475/221 |
| 5,860,499 A * | 1/1999 | Onimaru et al. ............. 192/3.3 |
| 5,918,715 A | 7/1999 | Ruth et al. .................... 192/46 |
| 5,967,277 A * | 10/1999 | Walter ....................... 192/43.1 |
| 5,992,592 A * | 11/1999 | Showalter .................. 192/43.1 |
| 6,053,293 A * | 4/2000 | Sato et al. .................... 192/35 |
| 6,149,543 A | 11/2000 | Breen ......................... 475/269 |
| 6,244,965 B1 * | 6/2001 | Klecker et al. ............... 464/81 |
| 6,460,671 B1 * | 10/2002 | Karambelas et al. .......... 192/36 |

FOREIGN PATENT DOCUMENTS

WO    WO 99/45289    9/1999

* cited by examiner

*Primary Examiner*—Saul Rodriguez
(74) *Attorney, Agent, or Firm*—Bliss McGlynn, P.C.; Greg Dziegielewski

(57) ABSTRACT

A method for the control of a bi-directional overrunning clutch assembly (10) disposed within a vehicle transmission, including the steps of initiating a drive function control routine (112) within an electronic control unit and sensing the commanded gear ratio within the transmission. The method steps further include determining whether a first gear function (132) should be initiated based on the commanded gear ratio and determining whether a second gear function (150) should be initiated based on the commanded gear ratio. The method also includes sensing whether the reverse engagement members (24B) and the forward engagement members (24A) of the bi-directional clutch (10) are engaged when neither the first gear function (132) nor the second gear function (150) are initiated.

17 Claims, 11 Drawing Sheets

METHOD FOR CONTROLLING A BI-DIRECTIONAL CLUTCH

BACKGROUND OF THE INVENTION

1. Field of the Invention

The present invention relates, generally to the control of bi-directional overrunning clutch assemblies and, more specifically, to a method for actively controlling a bi-directional, overrunning clutch assembly that has four modes of possible operation for use in motor vehicle driveline components such as transmissions, transfer cases, differentials and the like.

2. Description of the Related Art

Generally speaking, land vehicles require three basic components. These components include a power plant (such as an internal combustion engine), a power train and wheels. The power train's main component is typically referred to as the "transmission." Engine torque and speed are converted in the transmission in accordance with the tractive-power demand of the vehicle. Transmissions include one or more gear sets, which may include an inner gear, intermediate planet or pinion gears which are supported by their carriers, and outer ring gears. Various components of the gear sets are held or powered to change the gear ratios in the transmission. In addition to such planetary gear sets, driveline components may further include multi-disc friction devices that are employed as clutches or brakes. The multi-disc pack clutch is a friction device that is commonly employed as a holding mechanism in a transmission, transfer case or differential or the like. In addition, multi-disc friction devices also find use in industrial applications, such as wet brakes, for example, to brake the wheels on earth-moving equipment.

The multi-disc pack clutch or brake assembly has a clutch sub-assembly including a set of plates and a set of friction discs that are interleaved between one another. The plates and friction discs are bathed in a continual flow of lubricant and in "open pack" operation normally turn past one another without contact. The clutch or brake assembly also typically includes a piston. When a component of a gear set is to be held, as for example during a particular gear range, a piston is actuated so as to cause the plates and friction discs to come in contact with respect to one another. In certain applications, it is known to employ several multi-disc pack clutch devices in combination to establish different drive connections throughout the transmission, transfer case, or differential to provide various gear ratios in operation, or to brake a component.

When the discs are not engaged, there often remains a differential rotational speed of the drive and driven members which the clutch or brake bridges. Relative rotation between the friction discs and the plates during open-pack mode creates drag. This condition results in parasitic energy losses, reduces the efficiency of the transmission, transfer case or differential, and ultimately results in lower fuel efficiency.

In addition to multiple friction devices, one-way clutches are frequently employed in transmissions, transfer cases, and differentials to selectively transmit torque in one rotational direction, but not in the opposite rotational direction. To this end, one-way clutches typically include an inner race, an outer race, and an engagement mechanism disposed therebetween. The engagement mechanism is operable to lock the inner and outer races together thereby transmitting torque in one relative direction. The engagement mechanism is further operable to allow freewheeling rotation between the inner and outer races in the opposite rotational direction. Engagement mechanisms commonly used in one-way clutches of the related art include pawls, sprags, and rollers. A cage, along with biasing members, such as springs, are also sometimes employed to retain the pawls, sprags, or rollers between the inner and outer races as well as to selectively assist in the change of operational modes between torque translation and freewheeling actuation of the clutch, depending on the direction of rotation between the inner and outer races.

As noted above, one-way clutches of this type have been employed in numerous applications in transmission, transfer cases, and differentials. For example, one-way clutches have been employed in conjunction with multiple friction clutches and planetary gear sets to effect low and reverse gear ratios in conventional transmissions. While this arrangement has worked well for its intended purpose, some disadvantages remain. For example, the friction clutch remains a source of significant parasitic losses due to inherent drag between the friction plates when the clutch is operating in "open pack" mode. Still, the clutch is necessary for providing the proper holding torque in low and reverse gears. Accordingly, there remains a need in the art for a mechanism that can provide the appropriate holding torque for both low and rear gears in the transmission and yet results in less parasitic losses which are presently attributable to the multiple plate friction clutch used for this purpose. In addition, there is a need in the art for a device that continues to perform the functions of the one-way clutch as described above, particularly where the output speed of the transmission exceeds the input speed resulting in engine compression braking.

One-way clutches have also been employed in transfer cases that provide full time, part time, and "on demand" four wheel drive (4WD) capabilities. In these situations, the one-way clutch is typically disposed between the primary driveline and the secondary driveline. When the primary drive line attempts to over speed the secondary drive line, as will occur, for example, where the rear wheel is supported on a slick surface, such as ice and is spinning and the front wheels are solidly supported, the one-way clutch engages and transfers torque to the slipping wheel. In this way, 4WD is achieved, but in this case, only under circumstances that require it.

The use of a one-way overrunning clutch to selectively provide drive torque to a secondary driveline upon primary wheel slip has not, however, become a popular solution to part time 4WD vehicle requirements because of one problem: the clutch remains disengaged or inactive when reverse gear is selected unless, of course, the secondary driveline attempts to over speed the primary driveline. Thus, in a situation frequently requiring 4WD, that is, when the vehicle may need to be rocked or simply backed over terrain, a 4WD configuration utilizing a one-way overrunning clutch will simply not provide 4WD operation. This is a significant drawback of this clutch configuration.

Partially in response to this problem, bi-directional overrunning clutches have been proposed in the related art for use in these circumstances. These bi-directional overrunning clutch assemblies typically employ an inner race, an outer race, and a plurality of rollers as the engagement mechanism disposed therebetween. The bi-directional overrunning clutches of the prior art are, for the most part, designed to be self-actuating. While they appear to present a solution to certain problems identified above they have not been widely employed in transmission, transfer cases, and differentials of the related art. These self-actuating bi-directional overrunning clutches are relatively mechanically complex and have certain physical limitations and drawbacks. One such drawback is that the existing bi-directional clutches have a large angular distance from the engagement in one rotational direction to the engagement in the opposite rotational direction. This makes for undesirable driving conditions by causing hard lockups when changing directions and also brings about a short mechanical life due to the severe inherent impact forces of the engagement. Additionally, the self-actuating bi-directional clutches known in the related art cannot be selectively engaged in an efficient manner or to optimize the vehicle power output in response to varying driving conditions.

Accordingly, there remains a need in the art for a bi-directional clutch that can be selectively actuated and controlled in a manner to provide driving comfort and offer efficient operating modes for various driving conditions while eliminating the need for conventional multi-disc friction devices. Furthermore, there remains a need in the art for a controllable bi-directional overrunning clutch assembly that can provide torque translation in either rotational direction as well as one that may be employed as a substitute for conventional multi-disc friction devices presently known in the related art. In addition, there also remains a need in the art for a method to operatively control such a bi-directional clutch.

SUMMARY OF THE INVENTION

The disadvantages of the related art are overcome by the selective and pre-determined control method of the present invention as applied to a bi-directional overrunning clutch assembly. The method includes the steps of initiating a drive function control routine within an electronic control unit and sensing the commanded gear ratio set within an automotive transmission. In addition, the method includes the steps of determining whether a first gear function or a second gear function should be initiated based on the current gear ratio set within the transmission. When the first gear function is initiated, the forward engagement members of the bi-directional overrunning clutch are engaged and the reverse engagement members are engaged at very low speeds then disengaged as the vehicle speed exceeds a predetermined value. When the second gear function is initiated, both the forward and reverse engagement members are disengaged. The methodology of the present invention is also operable to control the bi-directional clutch when reverse, neutral or park are selected and even when manually selected first or manually selected second gear transmission operation is chosen.

The bi-directional clutch has an actuating cam that is operatively controlled during the method of the present invention to actuate the engagement members to provide four separate modes of operation between the inner and outer races of the clutch assembly. More specifically, the cam is controlled to operatively (1) disengage the engagement members to provide freewheeling between the inner and outer races in both rotational directions (as shown in FIG. 2); (2) to actuate the engagement members so that torque is translated in one rotational direction but to allow freewheeling in the opposite rotational direction as shown in FIG. 3; (3) to actuate the engagement members so that torque is translated in a direction opposite to that in mode (2) above, but allow freewheeling in the rotational direction opposite to that in which torque is translated in this mode (FIG. 4); and (4) to actuate the engagement members so that the inner and outer races are locked relative to each other and torque is translated in both rotational directions as shown in FIG. 5.

In this manner, the bi-directional overrunning clutch assembly as operatively and selectively controlled by the present invention provides four distinct modes as illustrated in FIGS. 2–5. Thus, this type of bi-directional overrunning clutch assembly having four operational modes may be employed as a component of an automotive driveline in a transmission, transfer case, or differential to eliminate other components while maintaining the requisite functionality when controlled by the present invention.

Another advantage of the control of a four mode bi-directional overrunning clutch assembly by the present invention is that when the clutch is used in connection with providing low and reverse gear ratios in the representative transmission illustrated in FIG. 6, at least one multi-disc friction clutch and a one-way clutch may be eliminated. In this way, the control of the clutch assembly by the present invention reduces parasitic energy loss, improves operational efficiency, and reduces cost.

Another advantage of the control of a four mode bi-directional overrunning clutch by the present invention is that the clutch may be employed in a transmission to provide the important engine braking effect that can occur when the speed of the transmission output shaft exceeds the speed of the input to any given planetary gear set.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 4:
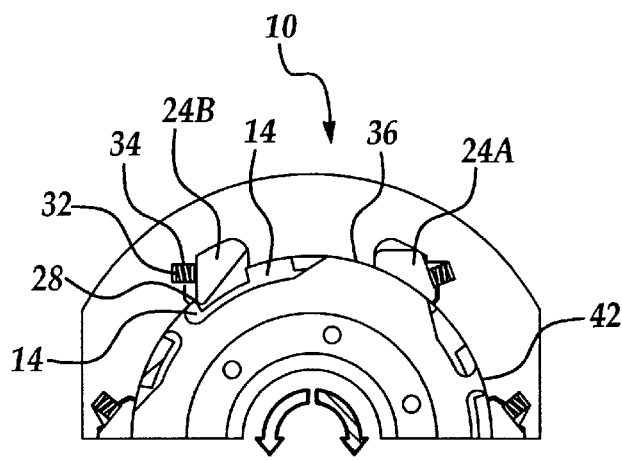
FIG. 4 is an enlarged partial side view of the bi-directional overrunning clutch assembly having four operational modes as controlled by the present invention illustrating a third mode of operation where a second set of pawls is engaged to provide torque translation in the opposite rotational direction as illustrated in FIG. 3 but to allow freewheeling movement between the inner race and the outer race in the rotational direction opposite to that in which torque is translated in this mode.
Figure 5:
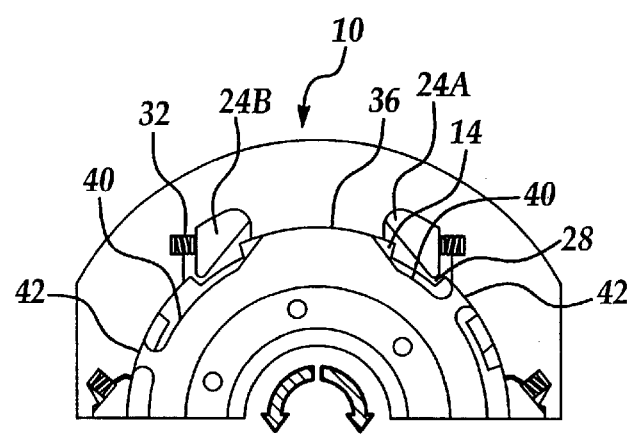
FIG. 5 is an enlarged partial side view of the bi-directional overrunning clutch assembly having four operational modes as controlled by the present invention illustrating a fourth mode of operation wherein both sets of pawls are engaged so that the inner and outer races are locked relative to each other and torque is translated in both rotational directions.
Figure 7:
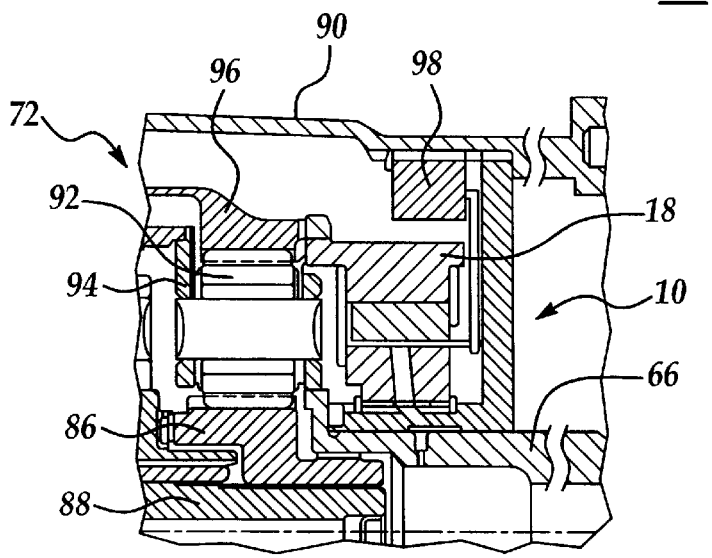
FIG. 7 is a schematic representation of a bi-directional overrunning clutch assembly having four operational modes as controlled by the present invention employed in conjunction with a planetary gear set to provide low and reverse gear ratios in the transmission of FIG. 6.
Figure 6:
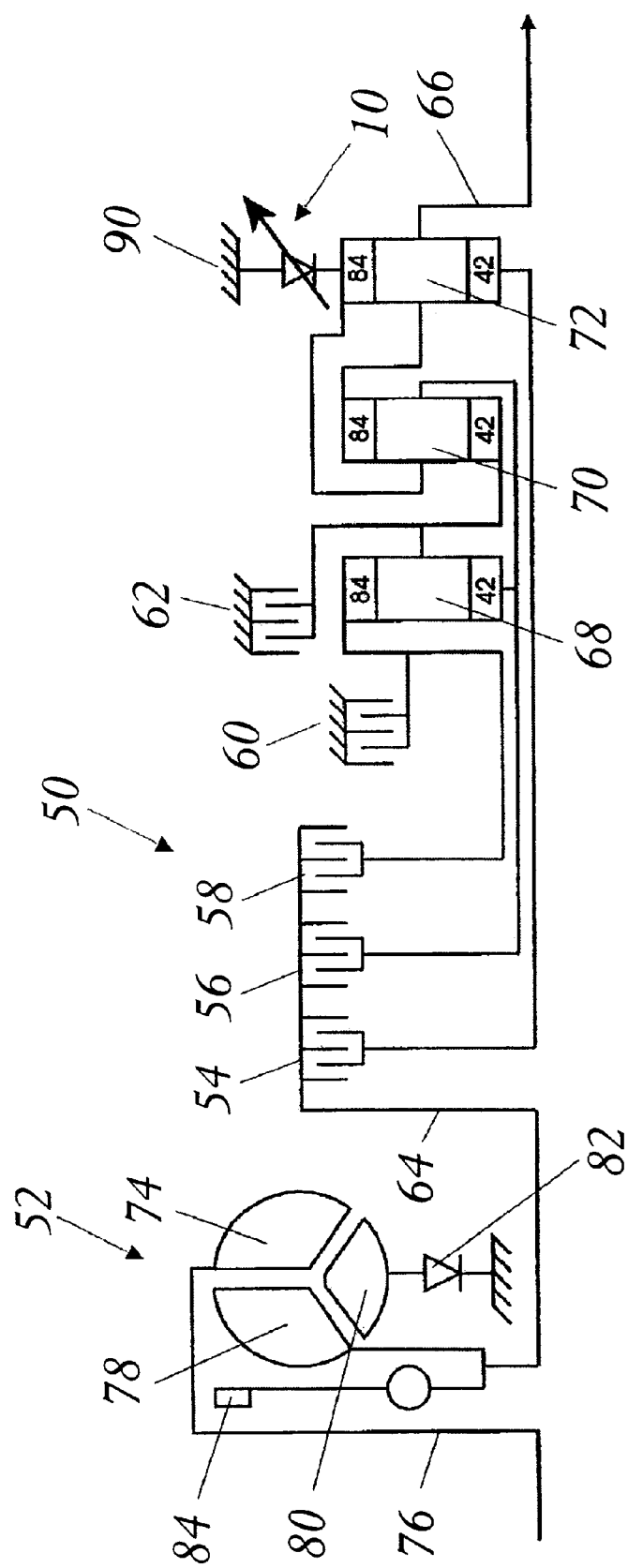
FIG. 6 is a schematic diagram depicting a transmission illustrating one possible use of a bi-directional overrunning clutch assembly having four operational modes as controlled by the present invention in connection with providing low and reverse gear ratios.

A bi-directional overrunning clutch assembly having four operational modes of the type that may be controlled by the present invention is generally indicated at 10 in FIGS. 1–5, where like numerals are used to designate like structure throughout the drawings. The various subcomponents of the clutch assembly 10 are illustrated in the exploded view of FIG. 1 and the four operational modes are illustrated in the partial side views of FIGS 2–5. The clutch assembly 10 is particularly adapted for use as a component of drivelines of land-based vehicles, such as in transmissions, transfer cases, differentials and the like. Accordingly, one application for the clutch assembly 10 of this particular type (i.e., having four operational modes) is shown in connection with a transmission, which is schematically illustrated in FIGS. 6 and 7. However, those having ordinary skill in the art will appreciate that the control of the clutch assembly by the present invention allows it to be employed in numerous applications, whether or not the application takes advantage of all four operational modes of the clutch assembly as discussed below.

Figure 1:
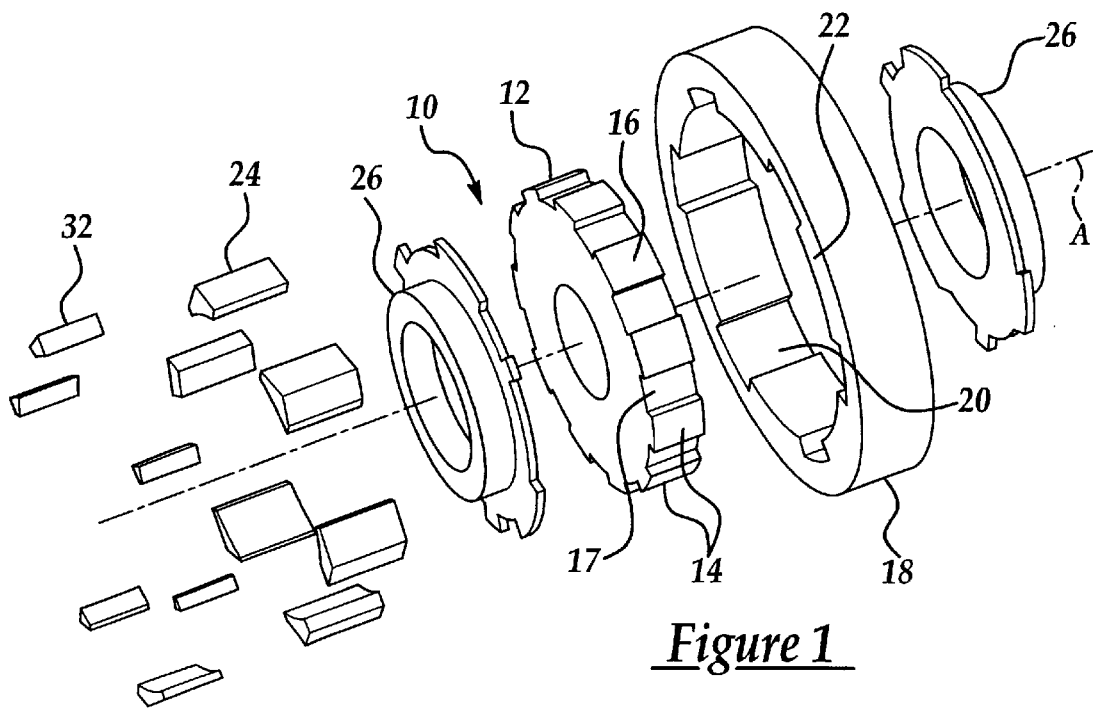
FIG. 1 is an exploded view of the bi-directional overrunning clutch assembly having four operational modes as controlled by the present invention.

Referring now to FIG. 1, the clutch assembly 10 as used with the control method of the present invention includes an inner race, generally indicated at 12, having a plurality of torque translating engagement teeth 14 disposed about the circumference of the outer diameter 16 of the inner race 12. The roots 17 of the teeth 14 are defined between adjacent teeth 14. An outer race, generally indicated at 18, is disposed concentrically about the inner race 12 and includes a plurality of cavities, generally indicated at 20, formed circumferentially about the inner diameter 22 of the outer race 18. Engagement members, generally indicated at 24 are supported within the cavities 20 of the outer race 18 and between the inner and outer races 12, 18, respectively. The clutch assembly 10 further includes at least one actuating cam, generally indicated at 26. The actuating cam 26 is operatively disposed relative to the inner and outer races 12, 18 to actuate the engagement members 24 to provide four separate modes of operation between the inner and outer races 12, 18 of the clutch assembly 10. Those having ordinary skill in the art will appreciate that, while a number of different types of engagement members may be employed within the scope of a bi-directional overrunning clutch assembly having four operational modes as controlled by the present invention, in the preferred embodiment for the clutch assembly, the engagement members are pawls 24.

Figure 2:
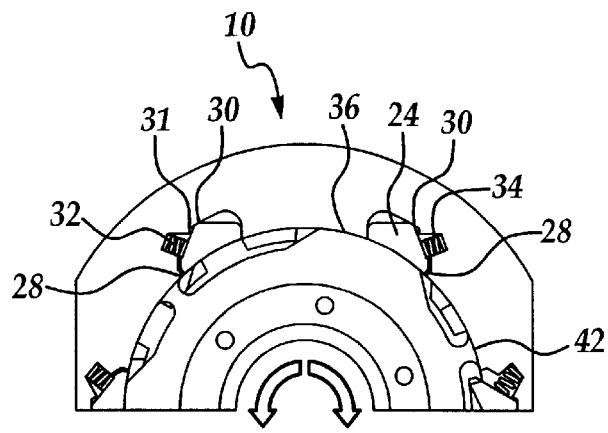
FIG. 2 is an enlarged partial side view of the bi-directional overrunning clutch assembly having four operational modes as controlled by the present invention illustrating one mode of operation where both sets of pawls are disengaged such that the clutch may freewheel in both directions.
Figure 3:
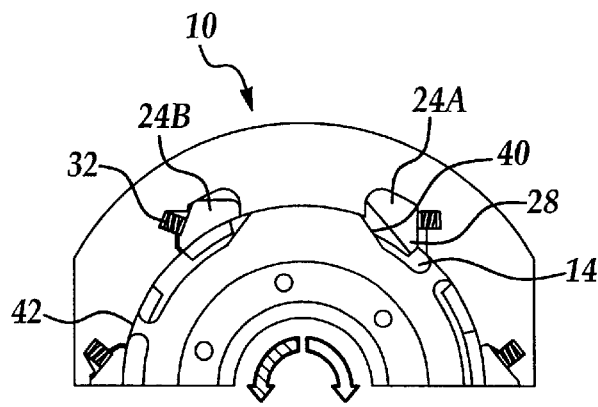
FIG. 3 is an enlarged partial side view of the bi-directional overrunning clutch assembly having four operational modes as controlled by the present invention illustrating another mode of operation where a first set of pawls is engaged so as to provide torque translation in one direction but allow freewheeling movement in the opposite rotational direction.

As shown in FIG. 2, there are two sets of pawls 24. One set allowing the engagement of the inner and outer races 12, 18 to occur such that the relative rotation of the engaged races will cause the transmission 50 and ultimately the vehicle to move forward. Thus, one set of pawls 24, as indicted in FIGS 3–5, are denoted as forward pawls, or forward engagement members 24A. Concomitantly, the engagement of the opposing, or second set of pawls 24 will allow for reverse movement and are therefore denoted as the reverse pawls, or reverse engagement members 24B. It should be appreciated that the denoting of one of the two sets of pawls 24 as "forward" and the other set as "reverse" is merely a relative designation dependant on the transmission shafts to which the clutch is attached and their relative rotational direction to achieve either a forward or reverse movement of the vehicle. In other words, the two sets of pawls 24A and 24B are identical and simply opposed to achieve the bi-directional function of the clutch.

Furthermore, while the pawls 24 may have any suitable geometric shape, as illustrated, for example, in FIGS 2–5, the pawls 24 have a generally triangular shape when viewed from the side. The pawls 24 are received in the cavities 20 formed in the inner diameter 22 of the outer race 18 and are supported in circumferentially spaced orientation about the rotational axis A of the clutch assembly 10. In addition, as best shown in FIG. 1, each pawl 24 defines a longitudinal axis that extends in the direction of the rotational axis A. Each pawl 24 has a nose portion 28 and a fulcrum portion 30 formed thereon. The fulcrum portion 30 is adapted to provide pivoting motion relative to a corresponding surface 31 defined by the cavity 20. A biasing member 32 is also captured in a special axially extending recess 34 formed in each cavity 20. The biasing member 32 provides a biasing force between the outer race 18 and the pawl 24 to bias the nose portion 28 of the pawl 24 into engagement with a torque-translating tooth 14 formed on the outer diameter 16 of the inner race 12. In the preferred embodiment, the biasing member 32 is a Z-shaped spring having a longitudinal axis which corresponds to the longitudinal axis of the associated pawl 24 and is disposed within the special recess 34 so as to be substantially parallel with the rotational axis A of the clutch assembly 10. However, those having ordinary skill in the art will appreciate that any number of biasing members known in the related art may be suitable for this purpose.

Each adjacent pawl 24 is supported by its associated cavity 20 such that the nose portion 28 of each adjacent pawl 24 is pointed, generally, in the opposite direction. In other words, adjacent pawls 24 are oriented in opposite directions. Thus, the two sets of pawls 24 mentioned above, the forward pawls 24A and the reverse pawls 24B, are adjacently interspersed about the races 18, 22 so that every other pawl (24A and 24B) is disposed to selectively provide torque translation in opposite rotational directions.

The method of the present invention controls the actuating cam 26 in such a manner so that the cam 26 is operable to (1) disengage the two sets of engagement members 24 to provide freewheeling between the inner and outer races 12, 18 in both rotational directions (as shown in FIG. 2); (2) to actuate one set of the engagement members (forward pawls 24A) so that torque is translated in one rotational direction but to allow freewheeling in the opposite rotational direction as shown in FIG. 3; (3) to actuate the opposing set of engagement members (reverse pawls 24B in FIG. 4) so that torque is translated in a direction opposite to that in mode (2) above, but allow freewheeling in the rotational direction opposite to that in which torque is translated in this mode; and (4) to actuate both set of engagement members (forward and reverse pawls 24A and 24B) so that the inner and outer races 12, 18 are locked relative to each other and torque is translated in both rotational directions (FIG. 5).

The actuating cam 26 is operable to actuate both sets of pawls 24 to selectively engage or disengage relative to the inner and outer races 12, 18, as the case may be. Preferably, the clutch assembly 10 includes a pair of actuating cams 26 as best shown in FIG. 1. The cams 26 may be disposed on either side of the inner and outer races 12, 18 or they may be nested with respect to each other and located on one side or the other of the clutch assembly. Each of the cams 26 may be selectively indexed to bring one set of pawls 24 into an engaged or disengaged position. To this end, each actuating cam 26 includes disengagement portions 36 spaced about the outer periphery thereof. The disengagement portions 36 are adapted to disengage every other pawl 24. Thus, when both actuating cams 26 are disposed in this orientation, they support each pawl 24A, 24B so that the pawls cannot engage the teeth 14 formed on the outer diameter 16 of the inner race 12. In this disposition, the clutch assembly 10 may freewheel in either rotational direction as indicated by the open rotation arrows.

In addition, the actuating cams 26 include sloping portions 40. In the embodiment illustrated here, each disengaged portion 36 is formed between adjacent sloping portions 40. When a given cam 26 is oriented such that the sloping portion 40 is disposed opposite a pawl 24, the biasing member 32 acts to move the nose portion 28 of the pawl 24 in the direction of the outer diameter 16 of the inner race 12 and into engagement with one of the teeth 14 formed thereon. In this operative mode, torque is translated between the inner and outer races 12, 18 in one rotational direction or the other as illustrated in FIGS. 3 and 4. The open rotational arrows indicating freewheel movement and the crosshatched rotational arrows indicating engagement and torque translation. When the other cam 26 is actuated so that its disengagement portions 36 are disposed opposite the respective pawls 24, the clutch assembly 10 will freewheel in the opposite rotational direction as illustrated in FIGS. 3 and 4. On the other hand, when the sloping portions 40 of both actuating cams 26 are disposed opposite a corresponding pawl 24, the nose portion 28 of each pawl 24 is biased into engagement with a corresponding tooth 14 formed on the outer diameter 16 of the inner race 12. When both sets of pawls 24A and 24B are engaged in this manner, the inner and outer races 12, 18 are locked together and torque is translated in both rotational directions as illustrated in FIG. 5. Each actuating cam 26 includes a plurality of outer rotational guides 42 located between adjacent sloping portions 40. The outer rotational guides 42 engage the inner radius 22 of the outer race 18 and thereby provide concentric stability of the actuating cam 26 relative to the outer race 18.

As will be clear from the discussion that follows, the bi-directional overrunning clutch assembly 10 having four operational modes as controlled by the present invention may be employed in any number of applications to provide one or more of the four operational modes described above. For example, the clutch assembly 10 may be employed to eliminate a multi-disc friction clutch as well as other components that are commonly used in transmissions, transfer cases, and differentials. In this way, the clutch assembly 10 may result in a reduction of parasitic energy losses that are associated with the use of multi-plate friction disc clutches. When used in this way, the clutch assembly 10 thereby results in reduced weight and a concomitant reduction in cost in the associated driveline component.

One representative example of an advantageous use of the bi-directional overrunning clutch assembly having four operational modes as controlled by the present invention is shown in connection with a transmission, schematically illustrated at 50 in FIG. 6. The transmission 50 has a number of conventional components that are arranged to translate torque between a prime mover, such as an internal combustion engine (not shown) and the output of the transmission at various gear ratios. However, those having ordinary skill in the art will appreciate that the standard components of a transmission may be arranged in numerous ways to provide various gear ratios.

To this end, the transmission 50 includes a torque converter, generally indicated at 52, and a plurality of multi-plate friction disc clutches 54, 56, 58, 60, 62 or similar mechanisms that serve as holding mechanisms or brakes to translate torque between the primary transmission input shaft 64 and the primary transmission output shaft 66 acting through a plurality of planetary gear sets 68, 70, and 72, as is commonly known in the art. The torque converter 52 includes an impeller assembly 74 operatively connected for rotation with the torque input member 76 from the internal combustion engine, a turbine assembly 78 fluidly connected in driven relationship with the impeller assembly 74 and a stator assembly 80. These assemblies together form a substantially toroidal flow passage for kinetic fluid in the torque converter 52. Each assembly includes a plurality of blades or vanes that act to convert mechanical energy into hydrokinetic energy and back to mechanical energy. The stator assembly 80 of a conventional torque converter is locked against rotation in one direction but is free to spin about an axis in the direction of rotation of the impeller assembly 74 and the turbine assembly 78. A one-way clutch 82 is often employed for this purpose. When the stator assembly 80 is locked against rotation, the torque is multiplied by the torque converter. During torque multiplication, the output torque is greater than the input torque for the torque converter 52. In addition, conventional torque converters often employ clutches 84 interposed between the torque input member 76 and the turbine assembly 78 which are engaged and "lock up" at higher speed ratios (speed output/speed input). When the clutch 84 is locked up, there is a direct torque translation between the torque input member 76 and the transmission 50 through the turbine assembly 78.

In the particular transmission 50 illustrated in FIG. 6, an underdrive clutch 54, overdrive clutch 56, reverse clutch 58, fourth gear brake 60, and second gear brake 62 are employed as holding mechanisms to translate torque from the primary transmission input shaft 64 to various ones of the planetary gear sets 68, 70, and 72, as the case may be. In turn, each of the planetary gear sets include a sun gear operatively coupled to one of the clutches identified above, a ring gear disposed about the respective sun gear, and a plurality of pinion or planetary gears disposed in meshing relationship between the respective sun and ring gears. In this case, torque is provided from the underdrive clutch 54 to the sun gear 86 that is splined to the shaft 88. To control the bi-directional clutch 10, the actuator cam 26 is indexed to one of the modes illustrated in FIGS 2–5 via an actuator (electromagnetic, hydraulic, or otherwise) that is schematically illustrated at 98 in FIG. 7.

Figure 8:
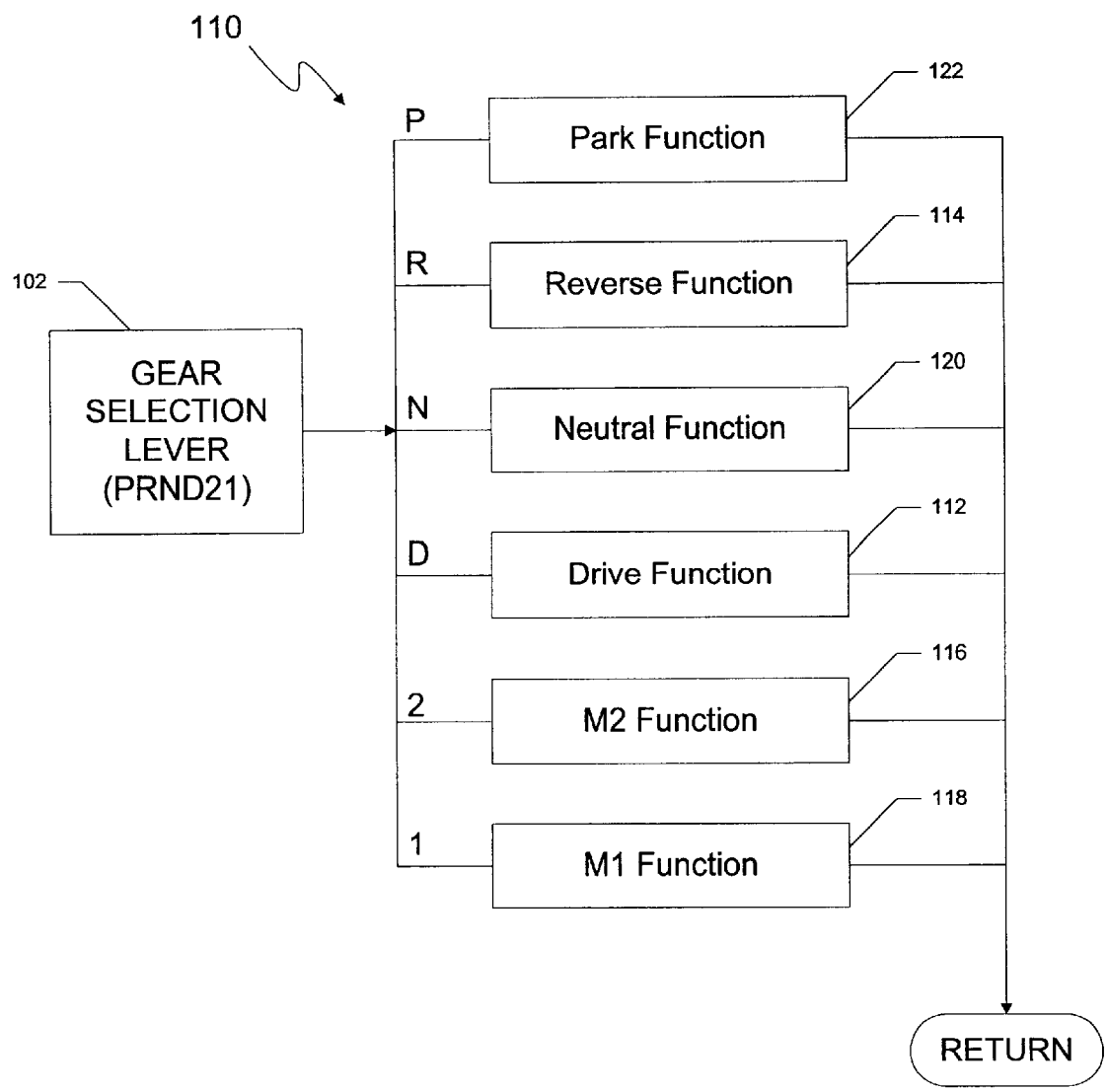
FIG. 8 is a block diagram flowchart of the functional modes of the present invention for controlling a bi-directional overrunning clutch assembly having four operational modes in connection with providing low and reverse gear ratios.

In the representative embodiment illustrated herein, the bi-directional overrunning clutch assembly 10, as controlled by the present invention, is employed in connection with the planetary gear set 72 that is used to provide low and reverse gear ratios. The physical application is schematically illustrated in FIG. 7 and the flow charts relating to the control of the clutch are shown in FIGS. 8–15. The general control scheme 110 of the bi-directional clutch 10 is represented in FIG. 8, which corresponds to the operator commanded control of the transmission 50 for its various available operating modes and gears. The positioning of a gear control, or gear selection lever 102 is the direct interface from the operator to the transmission 50 for the selection of operating modes. The positions of the gear selection lever 102 are represented in the typical manner as "Park", "Reverse", "Neutral", "Drive", "2" or second gear (manually selected), and "1" or first gear (manually selected). This is most often seen on a gear selection lever as the "PRND21" configuration. The gear selection lever 102 may also included a selection for overdrive operation by having an "O/D" position as well.

As schematically shown in FIG. 8, the position of the gear selection lever 102 causes the separate control functions of the bi-directional clutch 10 to occur. It should be appreciated that the schematic flow charts as illustrated here represent a control scheme, stored or otherwise located, within a greater control device such as an electronic control unit (ECU) overseeing the functioning of the transmission or an electronic control unit for the vehicle in which the transmission 50 may be installed. The control device may also be an electronic control for the hydraulic actuation of the transmission 50 or provide for a combined electronic and hydraulic control of the transmission 50. Regardless, there exists a control device, beyond the scope of this invention, for the control of the transmission 50 that is capable of providing the proper voltages, signals, and/or hydraulic pressures to operate the transmission 50 and particularly the actuating cams 26 of the bi-directional clutch 10. Thus, the control method of the present invention is described in connection with the flowcharts and may be a standalone process or merely a portion, such as a sub-routine, or series of sub-routines, of a larger control scheme within the ECU.

The method of the present invention as illustrated in the sub-routines of the flowcharts in FIGS 8–15 controls the actuation of the bi-directional clutch 10 so that the various modes of the bi-directional clutch 10 are selectively achieved. When in Drive and low (or first) gear, the present invention controls the clutch 10 to function as a forward driving one-way overrunning clutch by having only the forward pawls 24A engaged. When in Drive and any higher gear, the present invention controls the clutch 10 to have both sets of pawls 24 disengaged, so that it efficiently freewheels in both directions. When in Reverse, the present invention controls the clutch 10 to have both sets of pawls 24 engaged so that the reverse pawls 24B drive the vehicle in reverse and the forward pawls 24A provide coast braking. In manually selected first gear, the present invention controls the clutch 10 to have initially both sets of pawls 24 engaged so that the forward pawls 24A drive the vehicle with the reverse pawls 24B providing coast braking up to a predetermined speed at which the coast breaking reverse pawls 24B are disengaged.

In operating the vehicle, the gear selection lever 102 may be placed in the "D" position to initiate forward motion. From a standing start, a low gear, such as first gear, will be automatically selected and the "Drive Function" 112 of the present invention, as shown in FIG. 8 (and in greater detail in FIG. 9), will be performed to actuate the actuation cams 26 and control the bi-directional clutch 10. Each of the gear functions are initiated by the ECU when there is either a commanded gear change by movement of the gear selection lever 102 or by automatic gear change operation of the transmission 50 itself Physically, the actuation cam 26 will be indexed by the control method, as described below, to the mode illustrated in FIG. 3 via an actuator, which is schematically illustrated at 98 in FIG. 7. In this operational mode, the clutch 10 translates torque in one direction relative to a forward movement of the vehicle, while allowing freewheeling in the opposite rotational direction.

Figure 9:
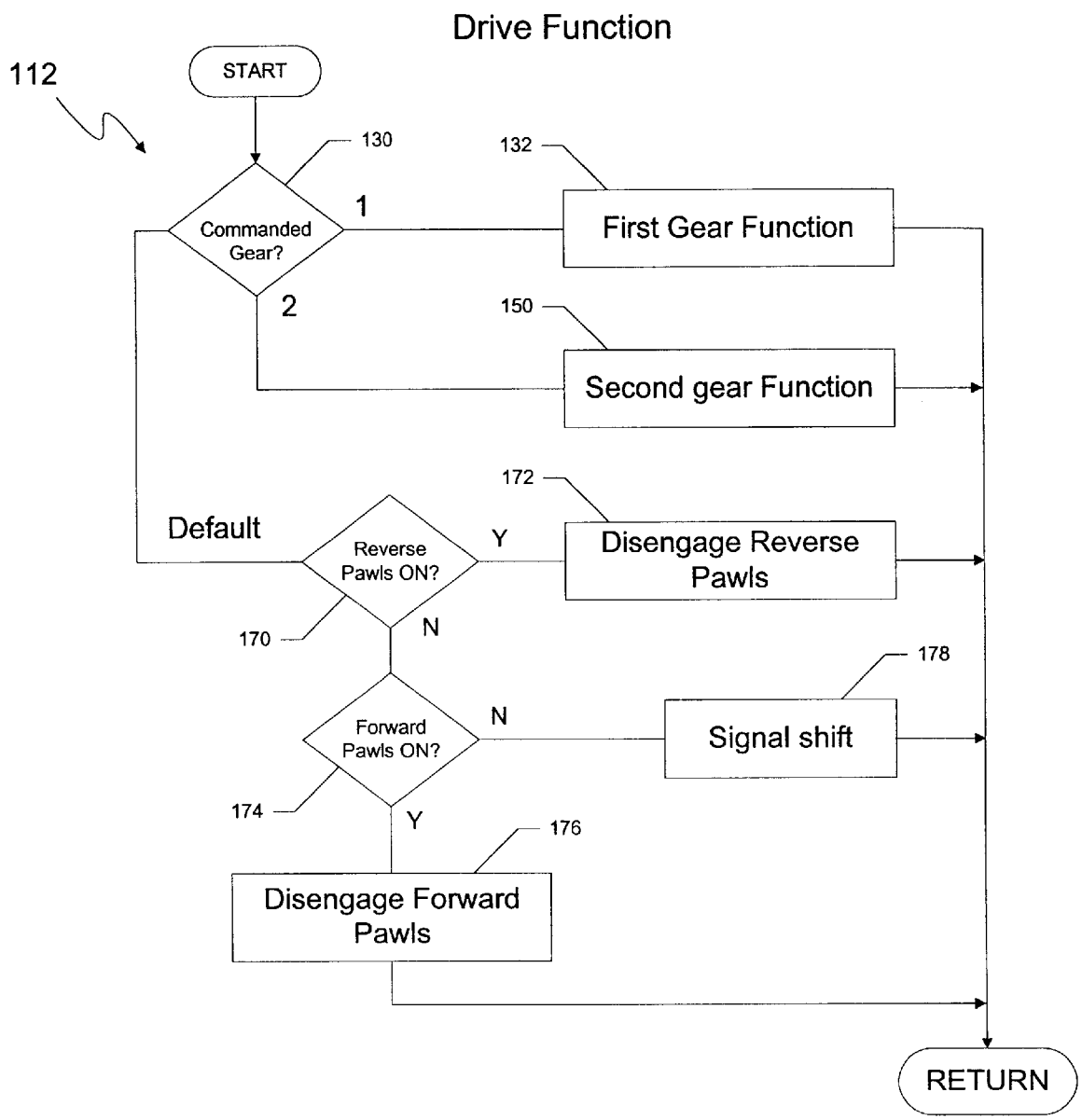
FIG. 9 is a block diagram flowchart of the drive functional mode of the present invention for controlling a bi-directional overrunning clutch assembly having four operational modes in connection with providing low and reverse gear ratios.
Figure 10:
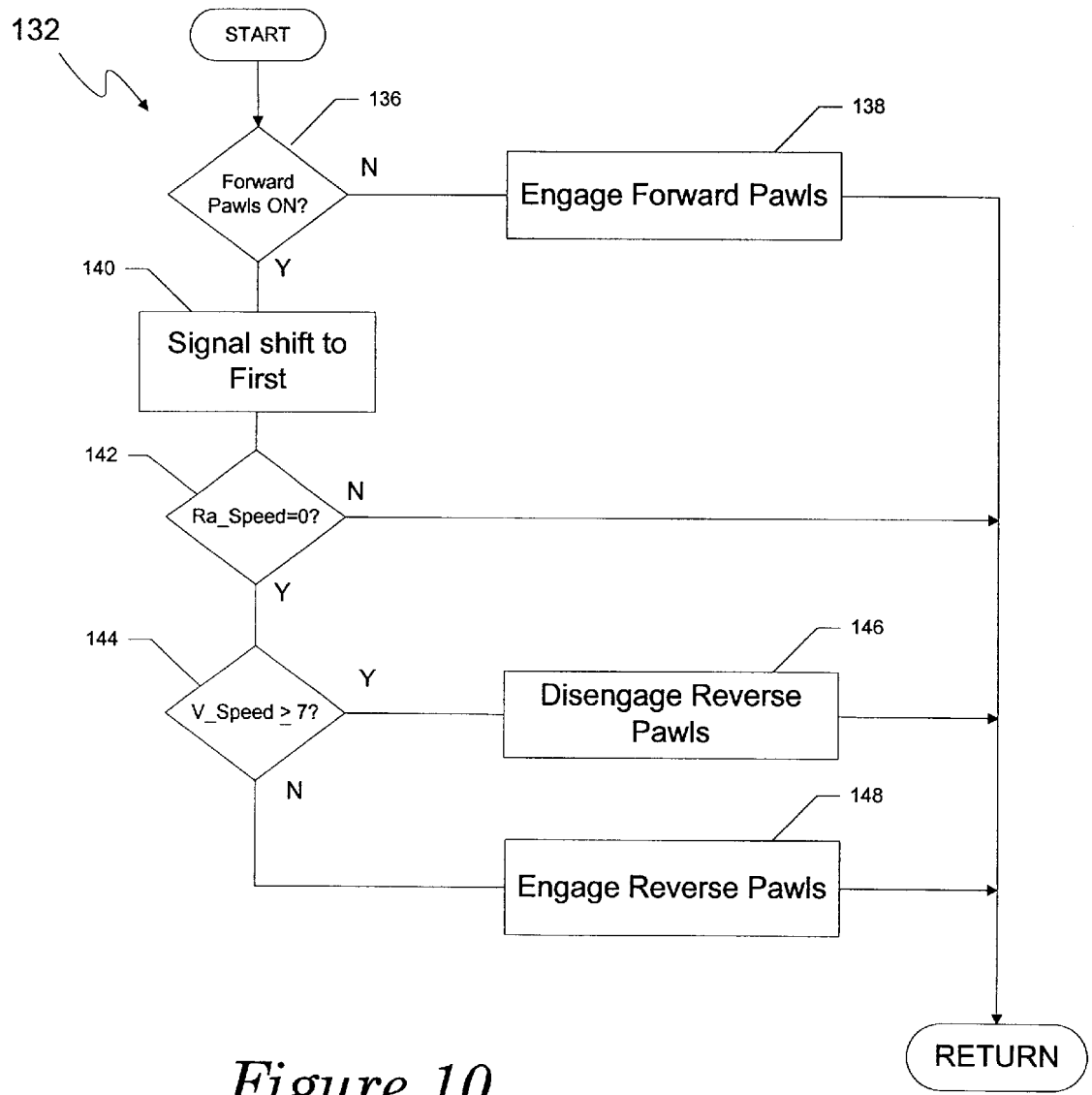
FIG. 10 is a block diagram flowchart of the first gear functional sub-routine of the drive function of the present invention for controlling a bi-directional overrunning clutch assembly having four operational modes in connection with providing low and reverse gear ratios.

The Drive Function mode for the control of the bi-directional clutch 10 as generally indicated in detail as 112 in FIG. 9 includes the step of having the ECU check which gear is currently commanded within the transmission case at decision block 130. This check is necessary as the vehicle could either be standing still and it will be necessary to shift the transmission to first gear to move the vehicle, or the vehicle will be slowing and the transmission 50 is downshifting to first gear. If the commanded gear noted in decision block 130 is first, then the First Gear Function is initiated at block 132, which is shown in detail in FIG. 10. The First Gear Function 132 starts at decision block 136 and checks the position of the actuator cams 26 to see if the forward pawls 24A of the bi-directional clutch 10 are engaged. If the forward pawls 24A are not engaged, the "NO" route is followed to the process block 138 and the ECU commands the specific actuator cam 26 to engage the forward pawls 24A between the inner and outer races of the bi-directional clutch 10.

This portion of the control path completes but the method steps continue back through to decision block 136 again as the gear selection lever 102 remains in the drive position and the shift will not have been completed. Once the decision block 136 is satisfied that the forward pawls 24A are engaged, the "YES" route is taken to process step 140 that provides a signal to the ECU to complete any other operations necessary to affect the shift to first gear. In this manner, the control method ensures that the forward pawls 24A of the bi-directional clutch 10 are engaged prior to attempting to provide torque in first gear to move the vehicle. Once the signal from process block 140 is sent to the ECU, the method continues to decision block 142 in which the ECU checks to see if the inner race 12 of the bi-directional clutch 10 is stationary (Ra_Speed=0?). If the inner race is not stationary, the "NO" branch is taken and the ECU will continue to recycle the process until the inner race 12 stops moving. At this point, the "YES" route is taken to decision block 144 in which the vehicle speed is sensed to see if a specific speed threshold has been met (V_Speed≧7?). The threshold is generally within the range of 5 to 8 MPH and is preferably around 7 MPH. Prior to the vehicle speed rising to met the predetermined threshold, the "NO" branch will be followed and the reverse pawls 24B will be engaged at process block 148. Once the vehicle meets and exceeds the threshold speed, the "YES" route will be followed and the reverse pawls 24B will be disengaged. The control of the bi-directional overrunning clutch assembly 10 by the present invention in the First Gear Function thus applies the reverse pawls 24B to provide reverse resistance in low speed or short distance situations such as garage and parking movements, while disengaging when proceeding in forward driving situations. This overcomes the drawbacks of the conventionally employed multi-disc friction clutches (that it replaces) or the conventional one-way clutches commonly employed for this purpose by avoiding the parasitic losses and the resultant reduction in fuel efficiency from the constant friction and mechanical contact of the multi-disc friction clutches or over-running one-way clutches.

As the vehicle and transmission 50 accelerate, the need arises to shift the transmission 50 to second gear. Concurrently, the ECU is cycling the Drive Function 112 control routine of the present invention and when the ECU determines that conditions are proper to initiate a shift from first gear to second gear, the method flow path takes the "2" route from decision block 130 (FIG. 9) to the Second Gear Function 150. As shown in the Second Gear Function flowchart of FIG. 11, the Second Gear Function 150 begins by checking to see if the reverse pawls 24B of the bi-directional clutch 10 are engaged in decision block 152. If the reverse pawls 24B are engaged, the "YES" route is followed to process block 154, which starts a delay timer in the ECU so that the shift is held off until the reverse pawls 24B are disengaged in the following process step 156. If the reverse pawls 24B are not engaged the "NO" route from decision block 152 is followed to process block 158 that provides a signal to the ECU to complete any other operations necessary to affect the shift from first to second gear. Once the signal at process block 158 is sent to the ECU, the actuator cam 26 position is checked to see if the forward pawls 24A are engaged at decision block 160. If the forward pawls 24A are not engaged, the "NO" route is followed and no other action is taken. If the forward pawls 24A are engaged, the "YES" route is followed to process block 162 in which the forward pawls 24A are disengaged. The ECU completes the shift and the control method 110 recycles in the Drive Function mode 112 until driving conditions change. In this manner, the control method ensures that the reverse pawls 24B of the bi-directional clutch 10 are disengaged prior to attempting to provide torque in second gear. This feature eliminates the typical overrunning of a conventional low gear one-way clutch through all the higher gears beyond its engaged use in first gear. Thus removing the parasitic loses normally associated with an overrunning clutch through the higher gears.

The default gear shift within the Drive Function 112 is used for shifts between any other forward gears that the transmission 50 may contain, apart from the previous mentioned First Gear Function 132 (shift to first) and the Second Gear Function 150. If either an upshift or a downshift occurs beyond second gear, then the default gear shift sub-routine is entered by the "Default" route from decision block 130, which leads to decision block 170 (FIG. 9). Decision block 170 has the ECU check to see if the reverse pawls 24B are engaged. If the reverse pawls 24B are engaged, the "YES" route is followed to process block 172 in which the reverse pawls 24B are disengaged and the process moves to decision block 174. If the reverse pawls 24B are not engaged, the "NO" route is followed directly to process block 174, which checks to see if the forward pawls 24A are engaged. If the forward pawls 24A are engaged, the "YES" route is followed to process block 176 in which the forward pawls 24A are disengaged and the flow path moves to decision block 178. If the forward pawls 24A are not engaged at decision block 174, the "NO" route is followed directly to the process block 178 in which a signal is provided to the ECU to complete the shift. The Drive Function is then complete and recycles until driving conditions again change. This ensures that in all automatic forward shifts, other than the two mentioned in detail above, the forward and reverse pawls 24B are disengaged and not forced to overrun and drag on the inner race. This is depicted in the cross-section illustration of the bi-directional clutch in FIG. 2, that shows that both of the actuation cams 26 are indexed to disengage both sets of pawls 24 so that the clutch 10 freewheels in both rotational directions when in the higher gears (i.e. 2nd and above).

Figure 12:
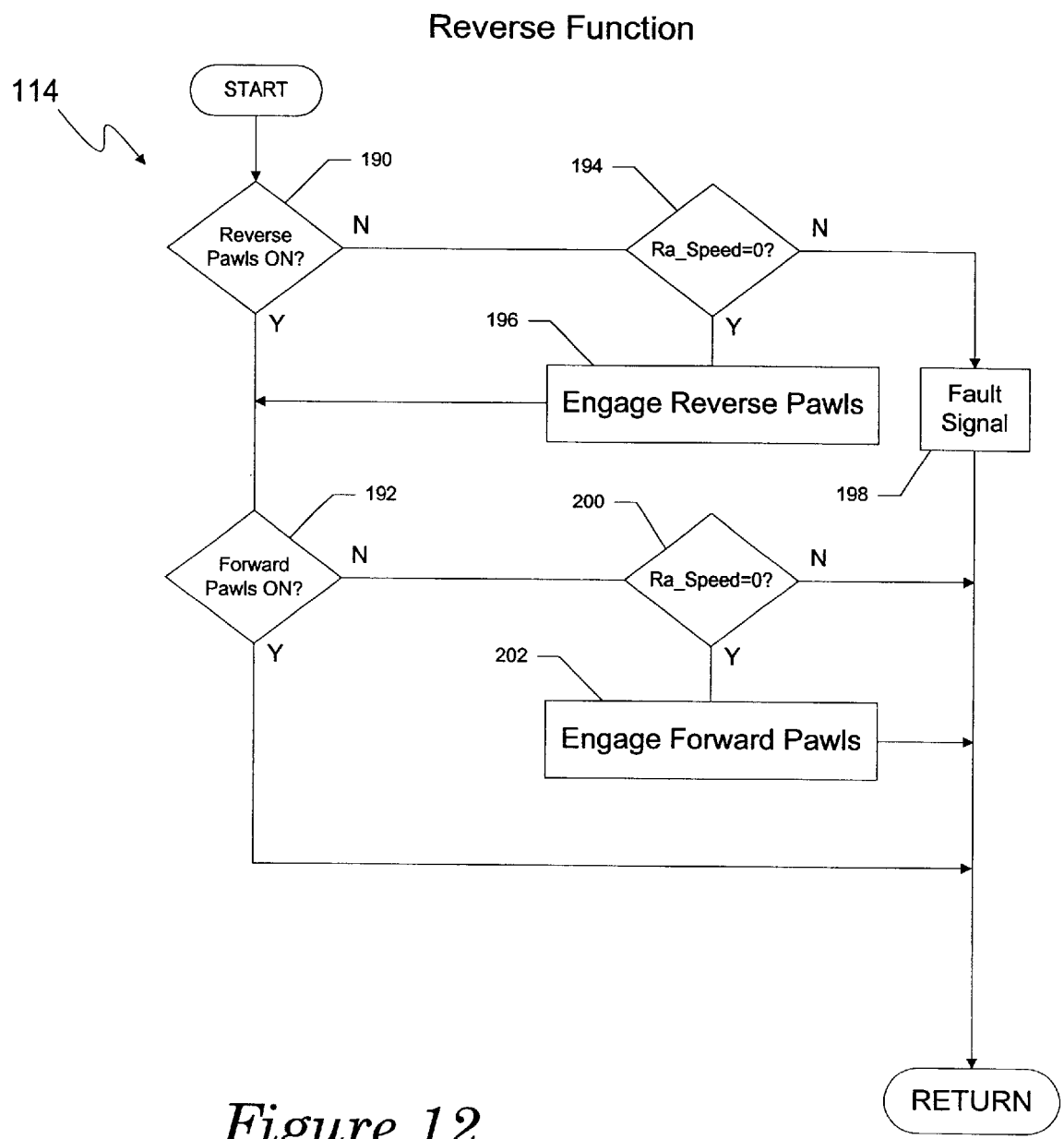
FIG. 12 is a block diagram flowchart of the reverse functional mode of the present invention for controlling a bi-directional overrunning clutch assembly having four operational modes in connection with providing low and reverse gear ratios.

The reverse control of the bi-directional clutch 10 by the present invention is initiated as shown in FIG. 8 by the moving the gear selection lever 102 into the reverse position and entering the "Reverse Function" 114. As best shown in FIG. 12, the Reverse Function 114 begins by entering decision block 190 in which the ECU checks the position of the actuator cams 26 to see if the reverse pawls 24B of the bi-directional clutch 10 are engaged. If the reverse pawls 24B are engaged, the "YES" route is followed directly to decision block 192. If the reverse pawls 24B are not engaged, the "NO" route is followed to the decision block 194, which checks if the inner race of the bi-directional clutch 10 is stationary (Ra_Speed=0?). If the inner race is moving, it the reverse pawls should not be engaged and the "NO" branch is taken and a fault signal is sent to the ECU at process block 198. This fault signal stops the ECU from taking any actions to engage the reverse gears since the inner race 12 is rotating and the transmission 50 would be damaged by forcing a reverse pawl 24B engagement. The process completes at this point. However, with the gear selection lever in the reverse position, the ECU will continue to recycle the process until the inner race 12 is stationary and the reverse pawls 24B can be properly engaged or the gear selection lever is moved to another position. If the inner race is stationary at decision block 194, the control method moves to the next step at process block 196, in which the ECU commands the specific actuator cam 26 to engage the reverse pawls 24B and continues to decision block 192.

As the control method continues, decision block 192 will check to see if the forward pawls 24A are engaged. If the forward pawls 24A are engaged, the "YES" route is followed and the Reverse Function 114 is complete. If the forward pawls 24A are not engaged, the "NO" route is followed to the decision block 200, which checks if the inner race of the bi-directional clutch 10 is stationary. If the inner race is moving the forward pawls 24A should not be engaged and the "NO" branch is taken so that the process is completed and can be recycled by the ECU as mentioned above. If the inner race is stationary at decision block 200, the control method moves to the next step at process block 202, in which the ECU commands the specific actuator cam 26 to engage the forward pawls 24A and complete the control method. In this manner, the reverse control method ensures that the both the forward pawls 24A and the reverse pawls 24B of the bi-directional clutch 10 are engaged prior to attempting to provide torque in reverse gear so that the reverse pawls 24B are used to drive the vehicle and the forward pawls 24A are used for coast breaking. This is depicted in the cross-section illustration of the bi-directional overrunning clutch 10 in the mode illustrated in FIG. 5 wherein both sets of pawls 24 are locked to provide torque translation in either direction.

Thus, in addition to reducing parasitic losses, the bi-directional overrunning clutch assembly 10 is employed in connection with low and reverse gears to provide an important engine braking function. This also occurs in the manually selected first gear when the forward pawls 24A, as representatively illustrated in FIG. 5, are engaged and the operator has his foot in the throttle of the internal combustion engine. In this operative mode, torque is translated from the inner race 12 to the transmission case 90. However, in a "lift foot" condition, the inner race 12 shifts and the reverse pawls 24B are engaged. In this operative mode, the wheels of the automobile drive through the transmission providing torque to the engine. The engine thus acts as a brake on the vehicle.

Figure 11:
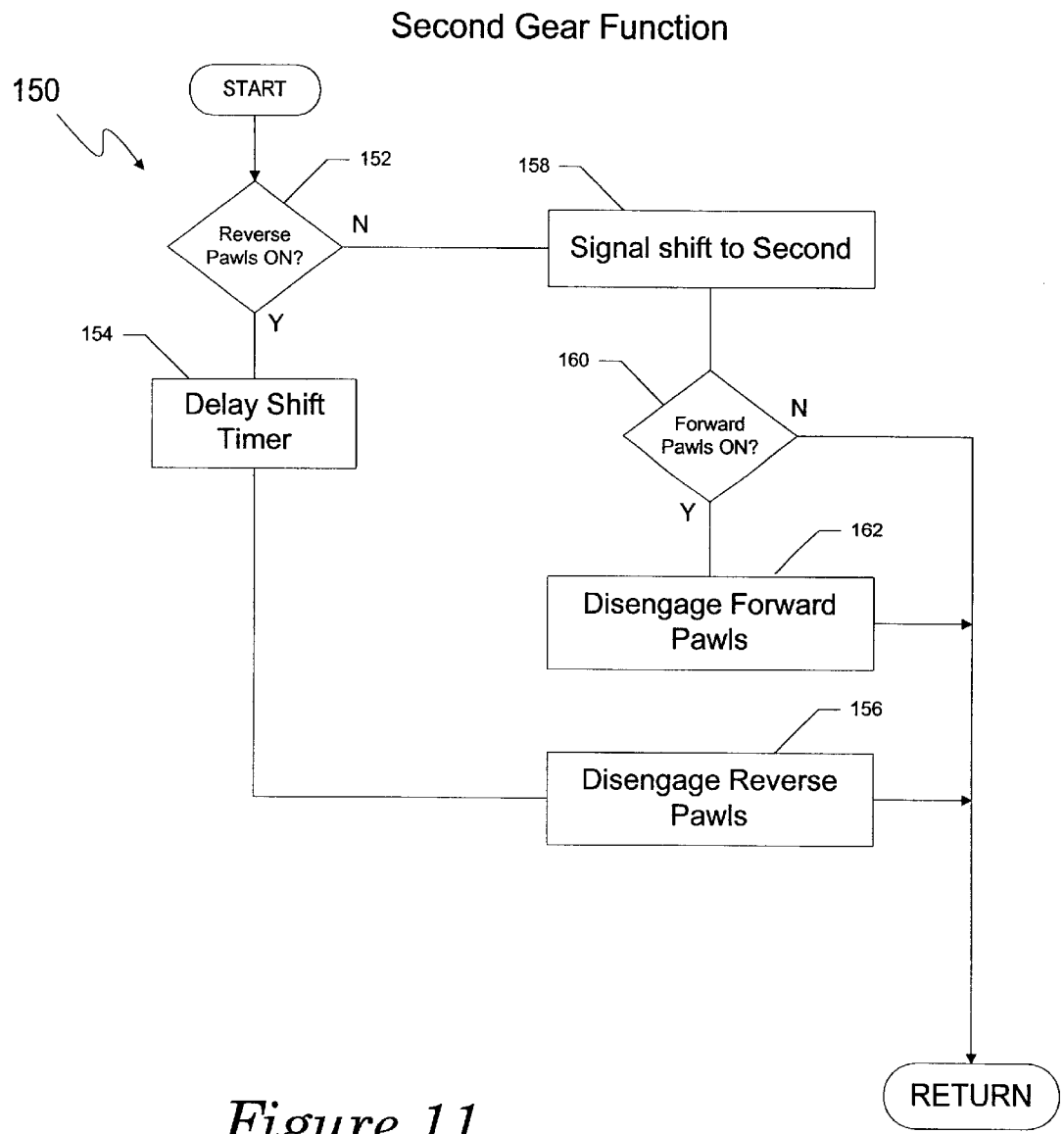
FIG. 11 is a block diagram flowchart of the second gear functional sub-routine of the drive function of the present invention for controlling a bi-directional overrunning clutch assembly having four operational modes in connection with providing low and reverse gear ratios.
Figure 13:
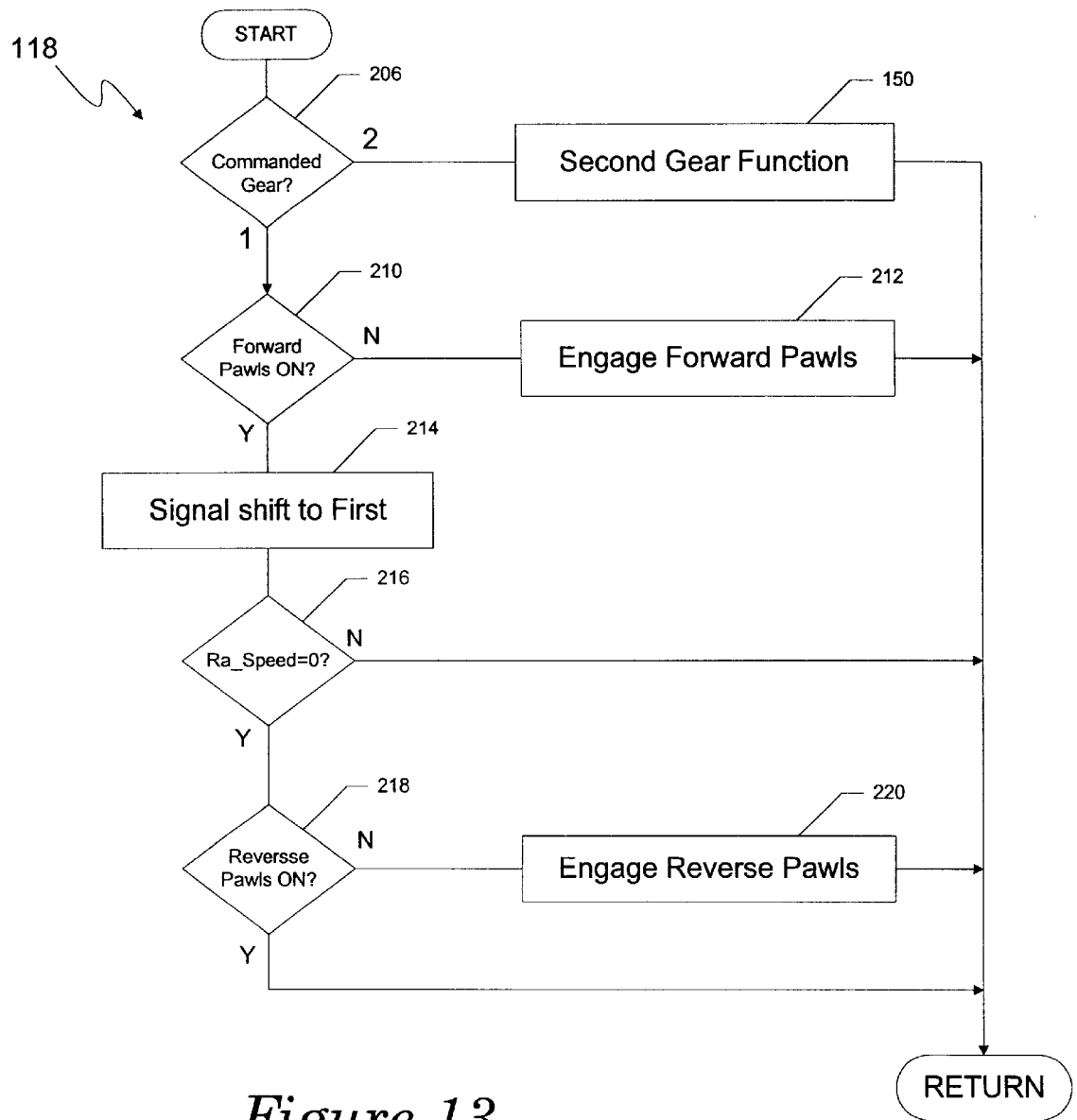
FIG. 13 is a block diagram flowchart of the M1, or manually selected first gear, functional mode of the present invention for controlling a bi-directional overrunning clutch assembly having four operational modes in connection with providing low and reverse gear ratios.
Figure 14:
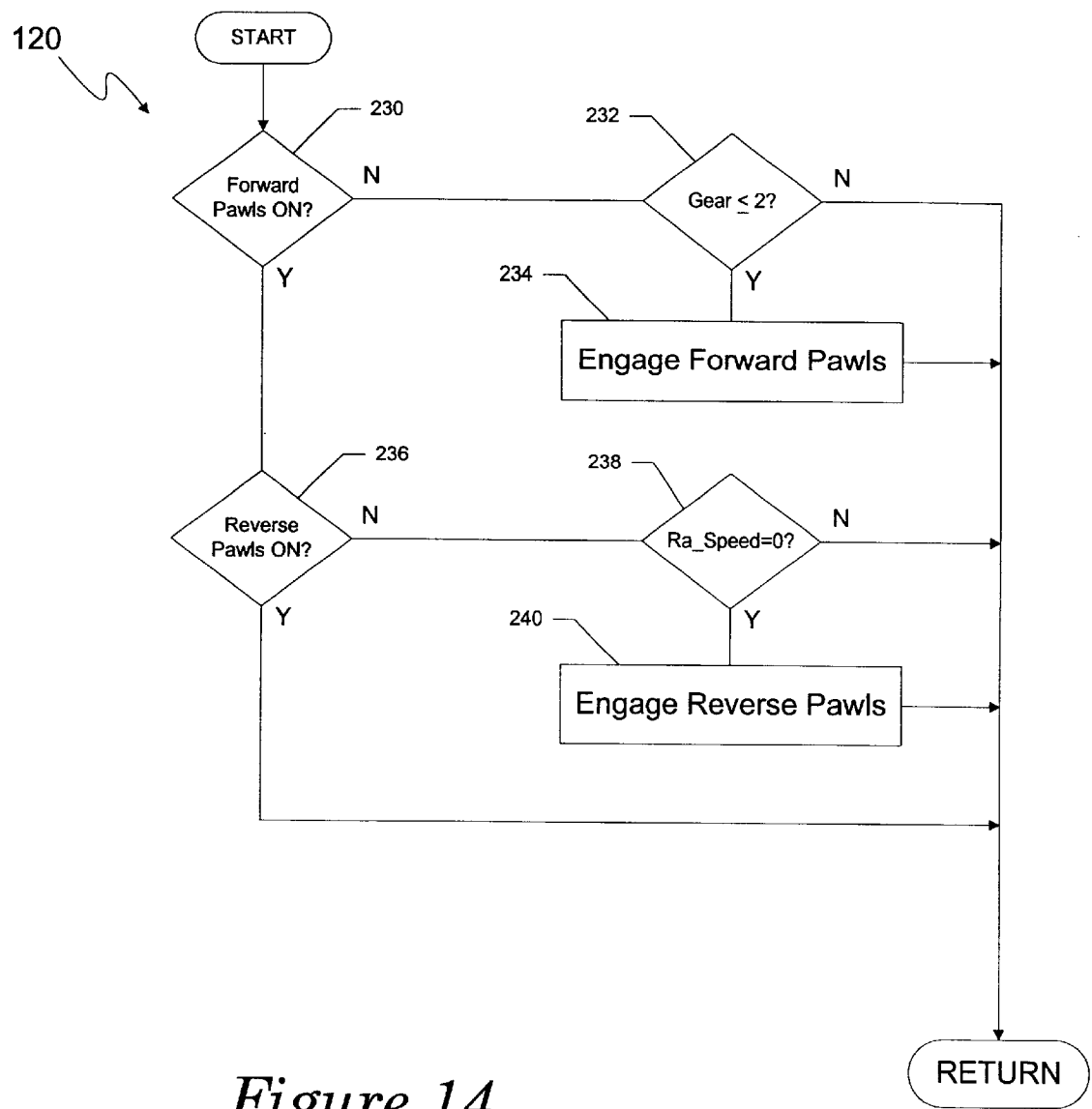
FIG. 14 is a block diagram flowchart of the neutral functional mode of the present invention for controlling a bi-directional overrunning clutch assembly having four operational modes in connection with providing low and reverse gear ratios.
Figure 15:
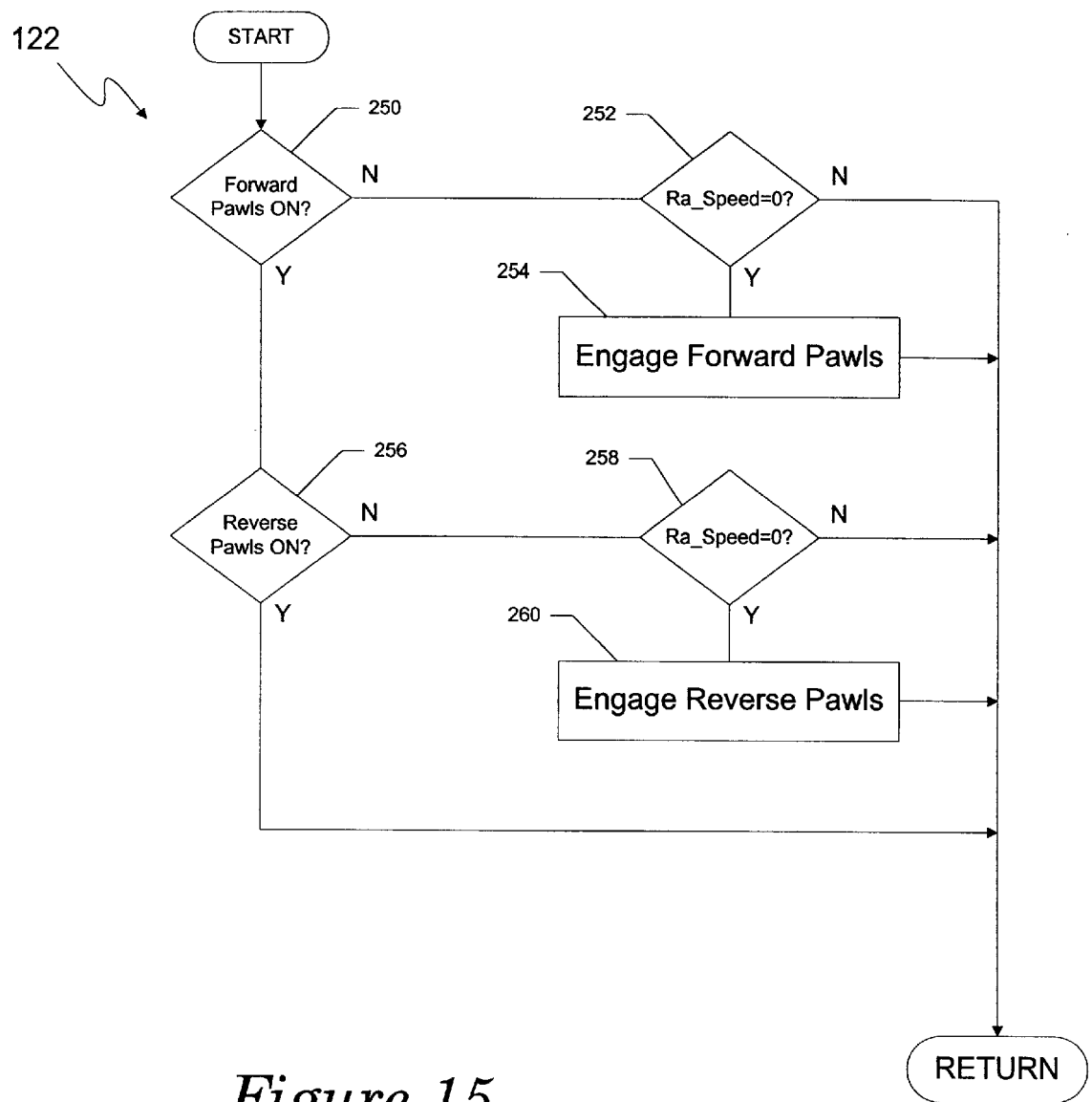
FIG. 15 is a block diagram flowchart of the park functional mode of the present invention for controlling a bi-directional overrunning clutch assembly having four operational modes in connection with providing low and reverse gear ratios.

In this regard, the method for the control of the bi-directional clutch 10 illustrated in FIG. 8 also includes the "M1 Function" (manually selected first gear) 118 and "M2 Function" (manually selected second gear) 116. When the manually selected first gear is chosen by moving the gear selection lever into the "1" position, the M1 Function 118 is initiated and the flowchart in FIG. 13 is followed. The M1 Function 118 starts at decision block 206 in which the ECU checks which gear is currently commanded. If the commanded gear is second (which will be the case if M1 has been selected while the transmission is operating in second gear or above), the method flow path takes the "2" route to the Second Gear Function 150 (FIG. 11). If the commanded gear at decision block 206 is first, the "1" route is taken to decision block 210 in which the ECU checks the position of the actuator cams 26 to see if the forward pawls 24A of the bi-directional clutch 10 are engaged. If the forward pawls 24A are not engaged, the "NO" route is followed to the process block 212 so that the ECU commands the specific actuator cam 26 to engage the forward pawls 24A between the inner and outer races of the bi-directional clutch 10. The ECU will cycle the control method back to decision block 210, which will then route the flow through the "YES" branch to process block 214 that signals the ECU to complete any other operations necessary to affect the shift to first gear. The control method continues to decision block 216, which checks to see if the inner race of the bi-directional clutch 10 is stationary (Ra_Speed=0?). If the inner race is not stationary, the "NO" route is taken and the process is recycled through to decision block 216 until the inner race 12 stops moving. At this point the "YES" route of decision block 216 is followed to decision block 218 in which the position of the actuator cam 26 is checked to see if the reverse pawls 24B are engaged. If the reverse pawls 24B are not engaged, the "NO " route of decision block 218 will be followed to process block 220 in which the ECU commands the reverse pawls 24B to engage. This action is taken to provide coast braking if the throttle is released.

The M2 Function (manually selected second gear) 116 is designed to limit the vehicle speed by preventing the transmission from upshifting beyond second gear. The M2 Function 116 illustrated in FIG. 8 simply includes both the First Gear Function 132 and the Second Gear Function 150 of the Drive Function 112 portion of the control method 110 of the present invention as previously discussed.

When Neutral is selected by the gear selector, the "Neutral Function" 120 is initiated as shown in FIG. 8. The Neutral Function 120 starts, as shown in FIG. 12, at decision block 230 which checks the position of the actuator cams 26 to see if the forward pawls 24A of the bi-directional clutch 10 are engaged. If the forward pawls 24A are not engaged, the "NO" route is followed to the decision block 232 in which the ECU checks to see if the current gear is second or first (Gear<=2?). If the gear is higher, the "NO" route is followed to recycle the method steps through decision block 232 until such time as the gear is reduced to second. When the gear falls to second, the "YES" route of decision block 232 is taken to process block 234 in which the ECU commands the specific actuator cam 26 to engage the forward pawls 24A. The method again recycles to decision block 230. If the forward pawls 24A are now engaged, the "YES" route is followed directly to decision block 236, which then checks to see if the reverse pawls 24B are engaged. If the reverse pawls 24B are engaged, the "YES" route is followed and the method steps are complete by having engaged both the forward and reverse pawls 24B in anticipation of entering first gear either through the Drive Function 112, or the manually selected first (M1 Function 118) or manually selected second (M2 Function 116) selections, or in anticipation of entering the Reverse Function 114 through the reverse gear selection, or finally in anticipation of entering the Park Function 122, discussed below.

If the reverse pawls 24B are not engaged, the "NO" route of decision block 236 is followed to the decision block 238 which checks if the inner race of the bi-directional clutch 10 is stationary (Ra_Speed=0?). If the inner race is moving the reverse pawls 24B should not be engaged and the "NO" branch is taken and the process recycles until the inner race 12 is stopped and the reverse pawls 24B can be properly engaged. If the inner race is stationary at decision block 238, the control method moves to the next step at process block 240, in which the ECU commands the specific actuator cam 26 to engage the reverse pawls 24B so that both the forward and reverse pawls 24B are engaged as mentioned above.

When Park is selected by the gear selector, the "Park Function" 122 is initiated as shown in FIG. 8. The Park Function 122 is illustrated in detail in FIG. 15 and begins, as shown, at decision block 250. Here, the position of the actuator cams 26 is checked to see if the forward pawls 24A of the bi-directional clutch 10 are engaged. If the forward pawls 24A are not engaged, the "NO" route is followed to the decision block 252 in which the ECU checks to see if the inner race of the bi-directional clutch 10 is stationary (Ra_Speed=0?). If the inner race is moving the forward pawls 24A should not be engaged and the "NO" branch is taken and the process recycles until the inner race 12 is stopped and the forward pawls 24A can be properly engaged. If the inner race is stationary at decision block 252, the "YES" route of is taken to process block 254 in which the ECU commands the specific actuator cam 26 to engage the forward pawls 24A. The method again recycles to decision block 250. If the forward pawls 24A are now engaged, the "YES" route is followed directly to decision block 256, which then checks to see if the reverse pawls 24B are engaged. If the reverse pawls 24B are engaged, the "YES" route is followed and the method steps are complete by having engaged both the forward and reverse pawls.

If the reverse pawls 24B are not engaged at decision block 256, the "NO" route is followed to the decision block 258, which again checks if the inner race of the bi-directional clutch 10 is stationary (Ra_Speed=0?). If the inner race is moving the reverse pawls 24B should not be engaged and the "NO" branch is taken and the process recycles until the inner race 12 is stopped and the reverse pawls 24B can be properly engaged. If the inner race is stationary at decision block 258, the control method moves to the next step at process block 260, in which the ECU commands the specific actuator cam 26 to engage the reverse pawls 24B. The end result of the Park Function 122 is that both the forward and reverse pawls 24A and 24B are engaged. This provides an additional braking action for the parked vehicle beyond any other locking or holding mechanisms within the transmission. The pawls 24 are also set in further anticipation of entering first gear either through the Drive Function 112, or the manually selected first (M1 Function 118), or in anticipation of entering the Reverse Function 114 through the reverse gear selection when the vehicle is next commanded by the gear selection lever to engage gears to move the vehicle.

In this way, the bi-directional clutch is operatively controlled by the present invention to actuate the engagement members to provide four separate modes of operation between the inner and outer races of the clutch assembly. More specifically, the actuating cam is controlled to operatively (1) disengage the engagement members to provide freewheeling between the inner and outer races in both rotational directions (as shown in FIG. 2); (2) to actuate the engagement members so that torque is translated in one rotational direction but to allow freewheeling in the opposite rotational direction as shown in FIG. 3; (3) to actuate the engagement members so that torque is translated in a direction opposite to that in mode (2) above, but allow freewheeling in the rotational direction opposite to that in which torque is translated in this mode (FIG. 4); and (4) to actuate the engagement members so that the inner and outer races are locked relative to each other and torque is translated in both rotational directions as shown in FIG. 5.

Thus, the method of the present invention acts to operatively and selectively control the bi-directional overrunning clutch assembly to provide four distinct modes as illustrated in FIGS 2–5. This type of bi-directional overrunning clutch assembly having four operational modes may be employed as a component of an automotive driveline in a transmission, transfer case, or differential to eliminate other components while maintaining the requisite functionality when controlled by the present invention. When the clutch is used in connection with providing low and reverse gear ratios in the representative transmission illustrated in FIG. 6, at least one multi-disc friction clutch and a one-way clutch may be eliminated. In this way, the control of the clutch assembly by the present invention reduces parasitic energy loss, improves operational efficiency, and reduces cost. In addition, the clutch may be employed in a transmission to provide the important engine braking effect that can occur when the speed of the transmission output shaft exceeds the speed of the input to any given planetary gear set.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

We claim:

1. A method of controlling the actuation of a bi-directional clutch (10) disposed within a vehicle transmission, said method including the steps of:

initiating a drive function control routine (112) within an electronic control unit;

sensing the commanded gear ratio within the transmission;

determining whether a first gear function (132) should be initiated based on the commanded gear ratio;

determining whether a second gear function (150) should be initiated based on the commanded gear ratio; and sensing whether the reverse engagement members (24B) and the forward engagement members (24A) of the bi-directional clutch (10) are engaged when neither the first gear function (132) nor the second gear function (150) are initiated.

2. A method as set forth in claim 1 wherein said method step of determining whether a first gear function (132) should be initiated further includes the steps of:

initiating the first gear function (132) when the commanded gear ratio is first gear;

engaging the forward engagement members (24A) of the bi-directional clutch (10);

signaling the electronic control unit to complete the shift to first gear;

sensing whether the relative speed between the inner and outer races (12 and 18) of the bi-directional clutch (10) is zero;

determining whether the vehicle speed is greater than a predetermined value when the relative speed between the inner and outer races (12 and 18) of the bi-directional clutch (10) is zero; and engaging the reverse engagement members (24A and 24B) of the bi-directional clutch (10) when the vehicle speed is below the predetermined value and disengaging the reverse engagement members (24A and 24B) when the vehicle speed is equal to or greater than the predetermined value.

3. A method as set forth in claim 2 wherein said method step of determining whether the vehicle speed is greater than a predetermined value includes a value having a range of speeds from 5 to 8 miles per hour.

4. A method as set forth in claim 1 wherein said method step of determining whether a second gear function (150) should be initiated further includes the steps of:

initiating the second gear function (150) when the commanded gear ratio is second gear;

sensing whether the reverse engagement members (24B) of the bi-directional clutch (10) are engaged and disengaging the reverse engagement members (24B) when they are found to be engaged;

signaling the electronic control unit to complete the shift to second gear when the reverse engagement members 24B are not engaged;

sensing whether the forward engagement members (24A) of the bi-directional clutch are engaged and disengaging them when they are found to be engaged.

5. A method as set forth in claim 4 wherein said method step of sensing whether the reverse engagement members (24B) of the bi-directional clutch (10) are engaged further includes the step of setting a delay shift timer in the electronic control unit causing the electronic control unit to wait for the reverse engagement members (24B) to be disengaged before completing the shift to second gear.

6. A method as set forth in claim 1 wherein the step of initiating the drive function control routine (112) is accomplished by actuating a gear selection lever (102) to select the forward transmission drive gears and sending a control signal to the electronic control unit.

7. A method of controlling the actuation of a bi-directional clutch (10) as set forth in claim 1 wherein the method further includes the steps of:

initiating a neutral function control routine (120) within an electronic control unit;

sensing whether the forward engagement members (24A) of the bi-directional clutch (10) are engaged;

sensing whether the commanded gear is second or first when the forward engagement members (24A) are not engaged;

engaging the forward engagement members (24A) when the commanded gear is second or first;

sensing whether the reverse engagement members (24B) of the bi-directional clutch (10) are engaged;

sensing whether the relative speed between the inner and outer races (12 and 18) of the bi-directional clutch (10) is zero when the reverse engagement members are disengaged; and engaging the reverse engagement members (24B) when the inner and outer races (12 and 18) are stationary relative to one another.

8. A method as set forth in claim 7 wherein the step of initiating the neutral function control routine (120) is accomplished by actuating a gear selection lever (102) to select the neutral transmission position such that no drive gears are selected and the transmission is not engaged and sending a control signal to the electronic control unit.

9. A method of controlling the actuation of a bi-directional four-mode clutch (10) as set forth in claim 1 wherein the method further includes the steps of:

initiating a park function control routine (122) within an electronic control unit;

sensing whether forward engagement members (24A) of the bi-directional clutch (10) are engaged;

sensing whether the relative speed between the inner and outer races (12 and 18) of the bi-directional clutch (10) is zero and when the forward engagement members (24A) are disengaged;

engaging the forward engagement members (24A) when the inner and outer races (12 and 18) are stationary relative to one another;

sensing whether the reverse engagement members (24B) of the bi-directional clutch (10) are engaged;

sensing whether the relative speed between the inner and outer races (12 and 18) is zero when the reverse engagement members (24B) are disengaged; and engaging the reverse engagement members (24B) when the inner and outer races (12 and 18) are stationary relative to one another.

10. A method as set forth in claim 9 wherein the step of initiating the park function control routine (122) is accomplished by actuating a gear selection lever (102) to select the park transmission position such that no drive gears are selected and the transmission is locked, and sending a control signal to the electronic control unit.

11. A method of controlling the actuation of a bi-directional clutch (10) disposed within a vehicle transmission, said method including the steps of:

initiating a reverse function control routine (114) within an electronic control unit;

sensing whether the reverse engagement members (24B) of the bi-directional clutch (10) are engaged;

sensing whether the relative speed between the inner and outer races (12 and 18) of the bi-directional clutch (10) is zero when the reverse engagement members (24B) are disengaged;

engaging the reverse engagement members (24B) of the bi-directional clutch (10) when the inner and outer races (12 and 18) are stationary relative to one another;

sensing whether the forward engagement members (24A) of the bi-directional clutch (10) are engaged;

sensing whether the relative speed between the inner and outer races (12 and 18) of the bi-directional clutch (10) is zero when the forward engagement members (24A) are disengaged; and engaging the forward engagement members (24A) when the inner and outer races (12 and 18) are stationary relative to one another.

12. A method as set forth in claim 11 wherein said method further includes the step of sending a fault signal (198) to the electronic control unit to prevent engagement of the reverse engagement members (24B) of the bi-directional clutch (10) when the reverse engagement members (24B) are disengaged and the inner and outer races (12 and 18) are moving relative to one another.

13. A method as set forth in claim 11 wherein the step of initiating the reverse function control routine (114) is accomplished by actuating a gear selection lever (102) to select the reverse transmission drive gears and sending a control signal to the electronic control unit.

14. A method of controlling the actuation of a bi-directional clutch (10) disposed within a vehicle transmission, said method including the steps of:

initiating a manually selected first gear function control routine (118) within an electronic control unit;

sensing the commanded gear ratio within the transmission;

determining whether a second gear function (150) should be initiated based on the commanded gear ratio;

sensing whether forward engagement members (24A) of the bi-directional clutch (10) are engaged;

engaging the forward engagement members (24A) when they are found to be disengaged;

signaling the electronic control unit to complete the shift to first gear when the forward engagement members (24A) are engaged;

sensing whether the relative speed between the inner and outer races (12 and 18) of the bi-directional clutch (10) is zero;

sensing whether the reverse engagement members (24B) of the bi-directional clutch (10) are engaged; and engaging the reverse engagement members (24B) of the bi-directional clutch (10) when they are found to be disengaged.

15. A method as set forth in claim 14 wherein the step of initiating the manually selected first gear function (118) is accomplished by actuating a gear selection lever (102) to select the manually selected first gear, and sending a control signal to the electronic control unit.

16. A method of controlling the actuation of a bi-directional four-mode clutch (10) disposed within a vehicle transmission, the method includes the steps of:

initiating a drive function control routine (112) within an electronic control unit;

sensing the commanded gear within the transmission;

determining whether a first gear function (132) should be initiated based on the commanded gear;

initiating the first gear function (132) when first gear is commanded thereby engaging the forward engagement members (24A) of the bi-directional clutch (10) and conditionally disengaging the reverse engagement members (24B) when the vehicle speed exceeds a predetermined value;

determining whether a second gear function (150) should be initiated based on the commanded gear;

initiating the second gear function (150) when second gear is commanded thereby disengaging the forward and reverse engagement members (24A and 24B) of the bi-directional clutch (10); and disengaging the forward engagement members (24A) and the reverse engagement members (24B) of the bi-directional clutch (10) when neither the first gear function (132) nor the second gear function (150) are initiated.

17. A method as set forth in claim 16 wherein said method step of initiating the first gear function (132) and determining whether the vehicle speed is greater than a predetermined value includes a value having a range of speeds from 5 to 8 miles per hour.

* * * * *